Patented Jan. 17, 1950

2,494,771

UNITED STATES PATENT OFFICE 2,494,771

PHOSPHATIDE COMPOSITION AND SHORT-
ENING AND METHODS FOR MAKING SAME

Max C. Markley, St. Paul, Minn., assignor to
Cargill, Incorporated, Minneapolis, Minn., a
corporation of Delaware No Drawing. Application January 30, 1947,
Serial No. 725,279

12 Claims. (Cl. 99—118)

This invention relates to phosphatide compositions and to oil containing the same. Commercial vegetable lecithin or phosphatides commonly available are actually a mixture of vegetable phosphatides and the oil with which it normally occurs. 65% AI commercial lecithin is a familiar commodity. It contains 65% of materials which are not soluble in acetone, and these materials are primarily a mixture of lecithin and cephalin, hereinafter referred to as lecithin. The term 65% AI is a grade mark or designation in the trade to designate phosphatide-containing mixtures in which 65% of the weight of the mixture is acetone insoluble. The remaining part of the commercial material, that which is soluble in acetone, is primarily the vegetable oil in which the vegetable lecithin naturally occurs. 65% AI is a commercial grade since it contains about as high a percentage of lecithin as can be obtained conveniently in centrifuge operations by which the commercial lecithin (and oil) mixture is normally separated from the bulk of the oil in which the lecithin naturally occurs. In some centrifuging operations it is possible to obtain a lecithin content of 70% but this is about as high as it is feasible to operate.

The 65% AI commercial lecithin when initially prepared is a solid mass at room temperatures. It is somewhat similar in consistency to butter or axle grease. The color is likewise about the same as axle grease, although some bleaching can be obtained by using commercial bleaches.

The principal objections to the use of 65% AI commercial vegetable lecithin are due to viscosity of the material and its pronounced tendency to settle and form layers upon standing, particularly during storage and especially during cool storage. The material is fairly viscous when first prepared, but after even relatively short periods of standing in a drum or container, a heavy layer settles out and an oily layer comes to the top. The settled layer is very hard and cannot be reworked with the oil except with great effort; hence, use of the material is difficult. This tendency to settle into a hard lower layer and an oily top layer is much accentuated when the material stands in the cold. Even upon rewarming the lower layer remains hard and very difficult to work.

In order to overcome this difficulty it has heretofore been proposed to add stearic acid to the 65% AI vegetable lecithin, and in order to achieve the desired softening effect 10–12% stearic acid is added. The objection to this practice is that the addition of such quantities of any material to the 65% AI commercial lecithin substantially reduces the percentage of lecithin actually present due to the diluting effect. Thus, the addition of 12% by weight of stearic acid to 65% AI commercial lecithin reduces the actual lecithin content of the mixture to about 55%. In addition, the stearic acid additive is undesirable for many applications.

It is an object of the present invention to provide an improved commercial lecithin of reduced viscosity compared with that hitherto available and a composition capable of maintaining its fluidity throughout the temperatures usually encountered in users' establishments and even at low temperatures. It is also an object of the invention to provide a vegetable lecithin and oil composition which remains homogeneous during extended storage and even if frozen and then warmed.

Lecithin has desirable shortening properties and in addition has distinctly beneficial dietary properties in that it provides phosphorus in organic combination. Attempts to use liquid vegetable oils for shortening have hitherto met with little success due to the lack of spreading property of the material. In order to use shortening with a dry material such as flour, the shortening must have the property of spreading easily and of being extended until it is distributed evenly throughout the entire dry flour mass. Lard and hydrogenated animal and/or vegetable oils have this ability to be extended and spread upon the flour. Vegetable oils do not have this desirable spreading characteristic, for they form globules which do not break up easily.

It is a further object of the present invention to provide improved normally fluid compositions containing vegetable lecithin and oil capable of use as shortening in the place of solid or semi-solid shortenings such as lard or hydrogenated oils and fats and to provide oil-lecithin compositions capable of being extended with added oil to form fluid shortening.

Other and further objects of the invention are those inherent in the methods and compositions herein illustrated, described and claimed.

In carrying out the invention, a mixture is prepared containing an edible vegetable oil such as soya bean oil, corn oil, cottonseed oil or the like, vegetable phosphatides such as those derived from soyabean oil or similar edible oils and an aliphatic organic acid containing 5 to 20 carbons and containing one or more double bonds.

The vegetable lecithin is used in amounts ranging from 2% to 70% based upon the weight of the final mixture. The aliphatic organic acid containing 5 to 20 carbon atoms and one or more double bonds is used in percentages ranging from .1% to 1.2%, based upon the weight of the final composition. The balance of the mixture is a vegetable oil such as soyabean oil, cottonseed oil, peanut oil, corn oil or mixtures of these oils. Two general forms of the composition are provided in accordance with the invention, the first a ready-to-use shortening, the second a general purpose vegetable lecithin composition capable of general uses, among which uses are the extending of the general purpose composition with added edible vegetable oils to form a ready-to-use shortening composition.

The percentage range of ingredients in mixtures prepared for use as shortening are as given in the table below in which the percentages are based upon the weight of the final mixture:

| | |
|---|---|
| Aliphatic organic acid 5 to 20 carbons and one or more double bonds | .1% to 1.2%, preferably .1% to .2% |
| Vegetable phosphatide | 2% to 67%, preferably 2% to 5% |
| Oil | To balance |
| Total | 100% |

The preferred range of ingredients for use as shortening are .1% to .2% aliphatic organic acid; 2% to 5% phosphatides and the balance oil, such as soyabean oil.

The mixtures thus prepared distribute well upon flour and bread dough and can readily be prepared utilizing such compositions as the entire shortening ingredient. The bread so prepared has a softer, silkier crumb throughout than when lard or hydrogenated shortenings are utilized.

The range of ingredients for commercial lecithin mixtures prepared in accordance with the present invention for general purpose uses are as given in the table below in which the percentages are based upon the weight of the final mixture:

| | |
|---|---|
| Aliphatic organic acid, 5 to 20 carbons and one or more double bonds | 1% to 15%, preferably 1% to 4% |
| Phosphatides | 55% to 70% |
| Oil | To balance |
| Total | 100% |

Such mixtures are homogeneous, they are fluid at room temperatures and remain free from separation into oily layers even though they stand for long periods. Furthermore, they do not separate into layers upon reheating after being chilled or frozen.

In preparing the general purpose lecithin composition I prefer initially to prepare a 70% acetone insoluble composition. Thus, commercial lecithin may be recovered from soyabean oils by sludging and centrifuging in accordance with standard practice. The centrifuge is preferably adjusted so as to produce a 70% acetone insoluble product. This may be decolorized, if desired. To every 85 to 99 parts by weight of the oil and lecithin-containing and optionally bleached mixture obtained from the centrifuging, there is then added 1 to 15 parts by weight, preferably 2% to 4% of an organic aliphatic acid having 5 to 20 carbon atoms and the mixture thoroughly blended.

*Example I*

As an example of improved general purpose commercial lecithin there was prepared a mixture containing 65% phosphatides (lecithin) from soyabean oil, 2% oleic acid and 33% soya oil. The mixture was thoroughly blended. The mixture was homogeneous, fluid at room temperatures, stable (i. e. it did not after long standing separate into a phosphatide and an oil layer). When chilled the mixture did not readily separate upon reheating. The mixture was useful for all of the purposes for which 65% AI commercial lecithin is adapted.

*Example II*

A mixture was prepared as in Example I except that it contained soyabean phosphatides, 65%; oleic acid, 1%; and soyabean oil, 34%. The mixture was slightly stiff, yet perfectly workable, at room temperatures. It was not so stiff as ordinary commercial 65% AI phosphatides. It was moderately stable upon standing and after reheating after chilling, and was easily reworkable in a homogeneous mass.

*Example III*

A mixture was prepared as in Example I except that the percentage of oleic acid was increased to 4% and the soyabean oil decreased to 31%. The resultant mixture was completely homogeneous; there was no tendency whatever to separate into layers; it was thoroughly fluid at room temperatures and remained fluid at 40° F. and did not separate into layers, even though stored for many months or stored under freezing conditions and rewarming after freezing.

*Example IV*

A mixture was prepared as in Example I except that the proportions were as follows: Phosphatides from soyabean oil, 65%; sorbic acid, 1% and soyabean oil, 34%. The mixture was slightly stiff at room temperature but not so stiff as ordinary commercial 65% AI phosphatides. It was moderately stable upon standing and upon reheating after chilling. The sorbic acid was equal in effect to the oleic acid in Example II.

*Example V*

A mixture was prepared as in Example I except that 2% sorbic acid was substituted for the 2% oleic acid used in Example I. The mixture was homogeneous, fluid at room temperatures and stable, that is to say, it did not separate into a separate phosphatide layer and oil layer after long standing during storage. When re-heated after chilling the mixture likewise did not separate into separate layers.

*Example VI*

A mixture of soyabean oil, 95% and the product of Example I, 5%, was prepared. The product of Example I readily dispersed in the oil by merely stirring. After long standing or upon chilling there was, in some instances, a slight separation but the material which separated was readily and easily redispersed by ordinary stirring. The mixture of soyabean oil, 95%, and the product of Example I, 5%, so prepared had a very low surface tension and excellent spreading power. It could be worked readily into flour for dough making and the bread produced from doughs thus prepared had a softer, silkier crumb throughout than when prepared from doughs containing ordinary hydrogenated fat or lard shortenings.

For shortening purposes there is preferably used a vegetable oil, such as soyabean oil, cottonseed oil, corn oil, peanut oil or the like or mixtures of the same, together with 1% to 10% of the general purpose phosphatide-oil-organic aliphatic acid mixture of the type described in Examples I–V. The vegetable oil can, however, be added in any proportion desired, for the improved commercial lecithin mixtures of the present invention, particularly described in Examples I–V, can be extended with vegetable oils to almost any degree of dilutions. It is preferred, however, that the dilution not be carried so far as to reduce the amount of organic aliphatic acid to less than .1% to .2%.

Soyabean oil triglycerides when used for foodstuffs are initially refined and then usually deodorized by steam distillation at high temperatures and under high vacuum. This treatment removes the beany or grassy odor and flavor of the soyabean oil, which is objectionable to some users. Even with such treatment soyabean oils tend to revert and gradually re-acquire the beany or grassy taste and odor. It has been discovered, in accordance with the present invention, that benzoyl peroxide in amounts ranging from .01% to 1%, preferably about .1% when added to the soyabean oil (soyabean oil triglycerides), destroys the beany grassy odor or taste initially present therein and in addition prevents such taste and odor from returning, even when the oil is stored at room temperatures for periods in excess of four months. It is therefore preferred, in accordance with the present invention, to add a minor percentage, preferably about .1%, of benzoyl peroxide to the products of the present invention hereinbefore specified where they are intended for use in foodstuffs and where the vegetable oils therein are at least in part constituted by the vegetable triglycerides of soyabean oil.

As many apparently widely different embodiments of this invention may be made without departing from the spirit and scope thereof, it is to be understood that I do not limit myself to the specific embodiments herein except as defined by the appended claims.

What I claim is:

1. An improved stably fluid composition comprising 2% to 70% phosphatides, .1% to 1.2% of an aliphatic organic acid selected from the group consisting of oleic acid and sorbic acid and the balance an edible vegetable oil which composition remains homogeneous and relatively free flowing over a wide temperature range.

2. An improved stably fluid general purpose phosphatide source composition comprising 55% to 70% phosphatides, 1% to 15% of an aliphatic organic acid selected from the group consisting of oleic acid and sorbic acid and the balance an edible vegetable oil which composition remains homogeneous and relatively free flowing over a wide temperature range.

3. An edible stably fluid shortening composition comprising a mixture containing 2% to 5% phosphatides; .1% to 1.2% of an aliphatic organic acid selected from the group consisting of oleic acid and sorbic acid and the balance an edible vegetable oil which composition remains homogeneous and relatively free flowing over a wide temperature range.

4. An edible stably fluid shortening composition consisting of a mixture of 2% to 5% phosphatides; .1% to 1.2% of an aliphatic organic acid selected from the group consisting of oleic acid and sorbic acid, .01% to 1% benzoyl peroxide and the balance edible vegetable oils containing at least some soyabean triglycerides said composition being homogeneous and relatively free flowing over a wide temperature range.

5. The method of making edible vegetable oils dispersible on dry flours for shortening dough mixtures which comprises adding to said oils 2% to 5% phosphatides and .1% to .2% of an organic acid selected from the group consisting of oleic acid and sorbic acid.

6. The method of making commercial lecithin-oil mixtures homogeneous, relatively free flowing at ordinary temperatures and stable against separation into layers which comprises incorporating into the said compositions from 1% to 15% of an organic aliphatic acid selected from the group consisting of oleic acid and sorbic acid.

7. The method of making commercial lecithin-oil mixtures homogeneous, relatively free flowing at ordinary temperatures and stable against separation into layers which comprises incorporating into the said compositions from 1% to 4% of an organic aliphatic acid selected from the group consisting of oleic acid and sorbic acid.

8. An improved edible stably fluid composition comprising 2% to 70% phosphatides, .1% to 15% of an aliphatic organic acid selected from the group consisting of oleic acid and sorbic acid and the balance an edible vegetable oil which composition remains homogeneous and relatively free flowing over a wide temperature range.

9. An improved general purpose homogeneous and stably fluid phosphatide source composition consisting of 65% vegetable phosphatides from soyabean oil, 2% oleic acid and 33% soya oil.

10. An edible shortening consisting of 5% of the phosphatide source composition set forth in claim 9 and 95% soyabean oil.

11. An edible shortening as set forth in claim 10 containing 0.1% benzoyl peroxide.

12. An improved general purpose homogeneous and stably fluid phosphatide source composition consisting of 65% vegetable phosphatides from soya bean oil, 2% sorbic acid and 33% soya oil.

MAX C. MARKLEY.

REFERENCES CITED

The following references are of record in the file of this patent:

UNITED STATES PATENTS

| Number | Name | Date |
|---|---|---|
| 1,553,294 | Baker | Sept. 8, 1925 |
| 1,575,529 | Bollmann | Mar. 2, 1926 |
| 1,838,707 | Rutzler, Jr. et al. | Dec. 29, 1931 |
| 2,167,206 | Hodgins | July 25, 1939 |